June 18, 1968  J. E. LINDBERG  3,388,746
AIRCRAFT FIRE PREVENTION SYSTEM
Filed Sept. 26, 1966  3 Sheets-Sheet 1

INVENTOR
JOHN E. LINDBERG
BY
Owen, Wickersham & Erickson
ATTORNEYS

INVENTOR
JOHN E. LINDBERG
BY
Owen, Wickersham, & Erickson
ATTORNEYS

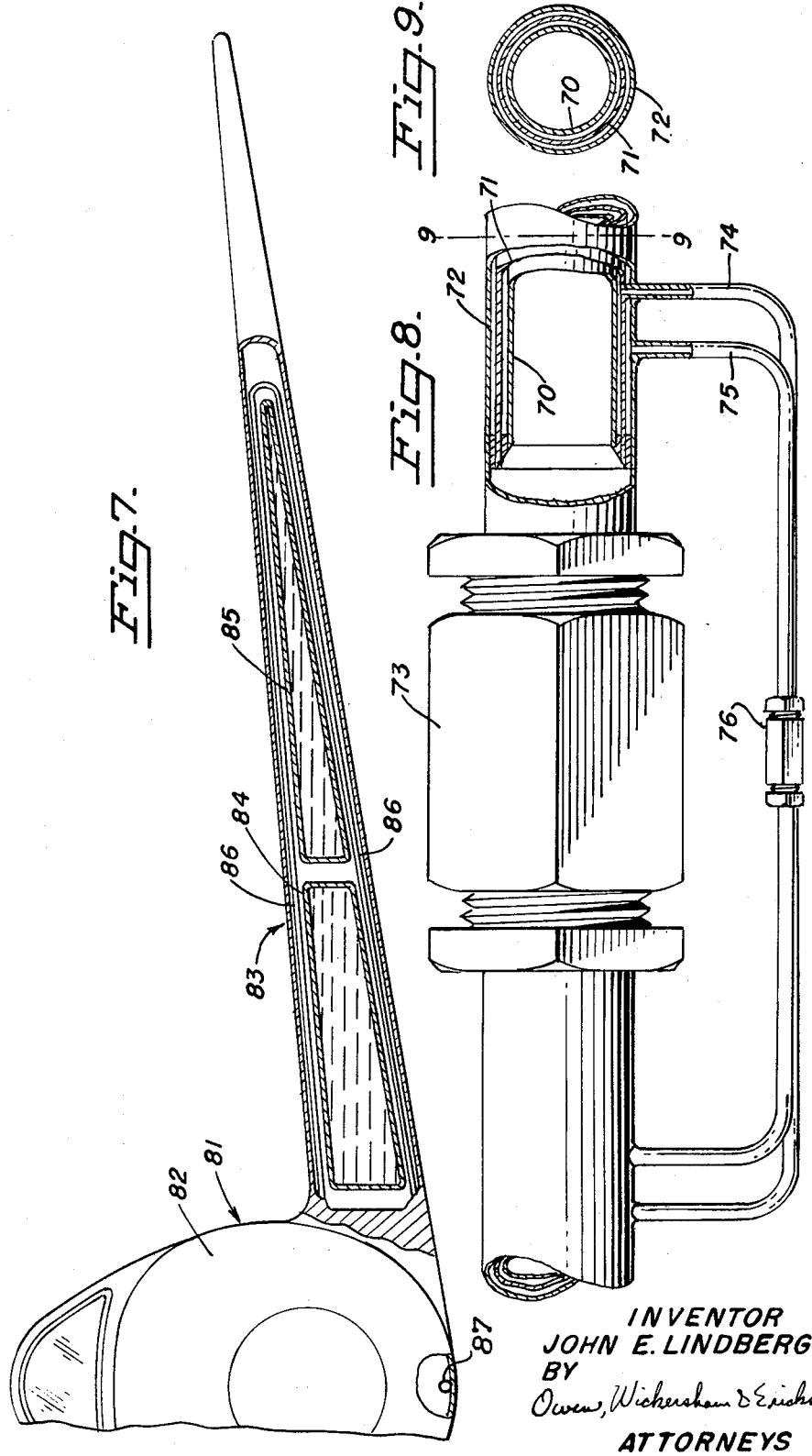

United States Patent Office 3,388,746
Patented June 18, 1968

3,388,746
AIRCRAFT FIRE PREVENTION SYSTEM
John E. Lindberg, 1211 Upper Happy Valley Road,
Lafayette, Calif. 94549
Continuation-in-part of application Ser. No. 528,879,
Feb. 21, 1966. This application Sept. 26, 1966, Ser.
No. 584,630
13 Claims. (Cl. 169—2)

ABSTRACT OF THE DISCLOSURE

A system for detecting structural overstressing and for giving warning or producing remedial action. A plurality of sensors are used, each being a pneumatic tube located along a path generally coaxial with the axis of the structural overstressing to be detected, the sensors being arranged in parallel with each other to give substantially duplicate paths. Each sensor has a pressure-actuated means actuated by the relief of pressure which results when the sensor tube is broken. These pressure-actuated means are connected in series for operation of a warning or remedial device only when all the pressure-actuated means in a series are actuated by relief of pressure from their respective sensors, so that the likelihood of a false warning or accidental actuation is very small.

---

This application is a continuation-in-part of application Ser. No. 528,879, filed Feb. 21, 1966, now abandoned.

This invention relates to a system for detecting and responding to structural overstresses. In a specific instance, it relates to an aircraft fire prevention system useful especially in connection with landing and take-off accidents.

While not confined thereto, the invention is particularly applicable to the detection of critical overstressing in aircraft. For example, if a fuel line is overstressed and breaks, fire will result and it is important to shut off the fuel supply to that fuel line immediately. Such breakage is most likely to occur in emergency or crash landings. Even in flight, overstressing is apt to occur at times; for example, the wings are liable to be overstressed when the pilot pulls out of a power dive too abruptly. If the pilot can be warned of the overstressing before the wing actually breaks off, he can usually bring the airplane out safely. There are, of course, many other instances when warning or response to structural overstressing close to or at failure, is desired, and it would be tedious and unnecessary to describe each one. One or more should serve and will be discussed briefly.

Fire is one of the big dangers in crash landings, and otherwise successful emergency landings may be frustrated by fires caused by fracture of fuel lines or by other similar damage which, minor in itself, has major consequences.

For example, many commercial transport planes have one or two rear-mounted engines. Since the fuel is carried principally in the wings, long fuel lines are employed to convey the fuel from the wings through the fuselage to the engines at the rear. An accident on take-off or on landing (which might be caused by failure of the landing gear or may result in such failure) may cause the fuselage to strike the ground with considerable force and at a substantial velocity. The ensuing forces may apply considerable stress to the fuel lines, fracturing them and releasing large quantities of their highly inflammable fluids, even draining the fuel storage tanks. The fluid may then be ignited, sometimes by sparks caused by the crash, sometimes by the engine ignition system, sometimes by other electrical equipment on the aircraft, and sometimes by careless or disobedient passengers who were smoking.

This example illustrates the type of problem with which this invention is concerned and shows that there is a need for some way of shutting off the flow of the inflammable fluids through the fractured fuel lines, so that fire may be prevented or at least minimized instead of being fed. Remedial action is also desirable.

Objects of this invention include the provision of a system wherein high stresses on structural elements result in a response, the provision of a system where stresses tending to fracture fuel lines act to automatically cut off the flow of fuel through them, the provision of a system of automatic cut-off of flow of inflammable fluids when the fuselage is damaged by a crash, the provision of an automatic remedial system for crash-caused fires and the provision of increased safety in aircraft.

Other objects and advantages of the invention will appear from the following description of some preferred embodiments thereof.

In the drawings:

FIG. 7 is a fragmentary view in front elevation and partly in section of part of an airplane having systems of this invention installed in its wing and fuselage.

FIG. 8 is a fragmentary view in side elevation and partly in section of a modified form of dual-integrity type of sensor.

FIG. 9 is a view in section taken along the line 9—9 in FIG. 8.

Figure 1:
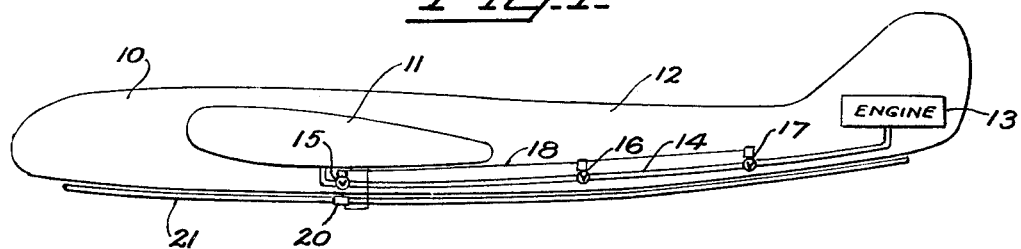
FIG. 1 is a somewhat diagrammatic view in side elevation of an aircraft incorporating a fuel-line-stress-detection system embodying the principles of the invention.

In FIG. 1, an aircraft 10 has a wing 11 in which fuel is stored, a fuselage 12, and a rear-mounted engine 13. A fuel line 14 leads from the wing 11 through the fuselage 12 to the engine 13. The invention provides a cut-off valve 15 closely adjacent the fuel tank (and there may also be other similar cut-off valves 16 and 17 at intervals along the line 14). The valve 15 (as well as the valves 16 and 17 when present) is normally open for the free flow of the fuel, but is controlled through a line 18 by a control device 20, and when the control device 20 is actuated the valve 15 is closed, as are the valves 16 and 17 if they are present. The control device 20 is pneumatically operated and is normally retained in an unactuated position by pressure in a tube 21. The tube 21 preferably contains an inert gas under pressure, and when the tube 21 is broken, the pressure is relieved, actuating the control device 20 and thereby closing the valve 15 (and the valves 16 and 17 if they are used), thereby cutting off the flow of fuel.

In the device of FIG. 1 the tube 21 is shown secured to the outside along the belly of the fuselage 12, so that if the fuselage 12 is struck with great force, the tube 21 is broken. The tube 21 is made of material that will not fracture when submitted to the vibrations and shocks of normal operation but will fracture upon being submitted to any blow that would fracture the fuel lines 14. Moreover, being located where it will be struck sharply by the ground in a crash, the tube 21 is broken before the line 14 can be broken.

Figure 2:
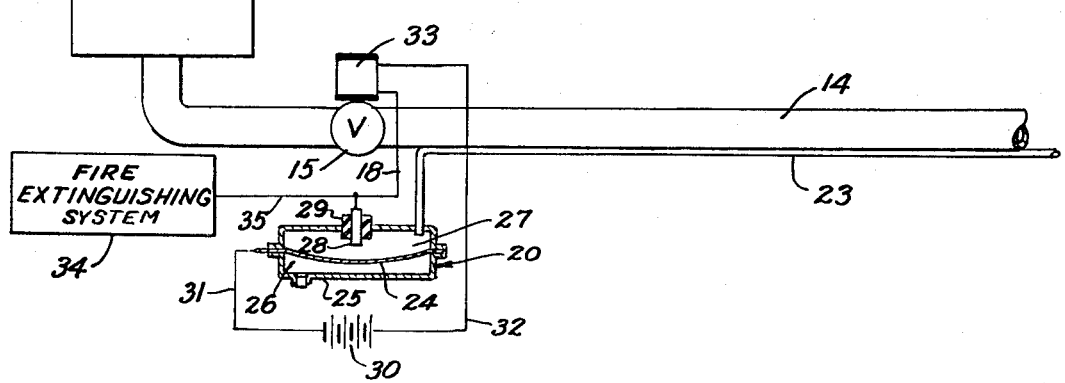
FIG. 2 is a diagrammatic view of a modified form of the invention applied to fuel lines.

FIG. 2 shows a modified form of the apparatus while also showing the operation in somewhat more detail. Here, a fuel tank 22 is connected to the fuel line 14, with the electrically operated shut-off valve 15 controlled by the control device 20. In this instance the control device has a gas-filled sensor tube 23 directly and firmly attached to the fuel line 14, as by cementing, welding, clamping or any other suitable attachment. Superatmospheric pressure in the tube 23 is exerted by an inert gas such as argon on a diaphragm 24 forming part of the control device 20.

The diaphragm 24 divides the interior of a housing 25 into two chambers 26 and 27. The chamber 26 is loaded with inert gas such as argon at a pressure above atmospheric but less than that in the sealed tube 23, which is connected to the chamber 27. Rupture of the tube 23 reduces the pressure in the chamber 27 to atmospheric, and the result is that the diaphragm 24 engages an electrode 28, which is insulated from the housing 25 by an insulator 29. The housing 25 and the diaphragm 24 may be metal, or only the diaphragm 24 may be metal, or it may be non-metal but carry a metal contact; in any event, a source 30 of electric power is connected by a lead 31 to the contacting part of the diaphragm 24. As a result, closure of the diaphragm 24 against the contact 28 sends power through the lead 18 to the valve 15 and thence by a return line 32 to the power source 30. At the valve 15, the power may operate a solenoid 33 to close the valve 15.

Preferably, the pressure in the tube 21 or 23 is high enough above atmospheric so that tube fracture quickly causes actuation of the diaphragm 24. The pressure may be 50 to 100 p.s.i.g., for example. The tube 23 is preferably made of metal which is less ductile than the metal of the fuel line 14; in any event the tube 23 is slightly more brittle or shock-frangible than the line 14. In lieu of direct attachment it is advisable for the axes of the tube 23 and line 14 to be parallel and for the tube 23 to be near the line 14. There may be more than one control device 20 for each tube 23, if desired.

For remedial action, the closure of the diaphragm 24 against the electrode 28 may also actuate a fire-extinguishing system 34, through a lead 35. Then the damaged area may be flooded with carbon dioxide or other fire-fighting gas or liquid or foam.

Being less ductile material than the line 14, the line 23 is broken by any stress that will break the line 14, and it will, in fact be broken first, so that the valve 15 will be closed by its solenoid 33 before the line 14 breaks, or at least not later.

Figure 3:
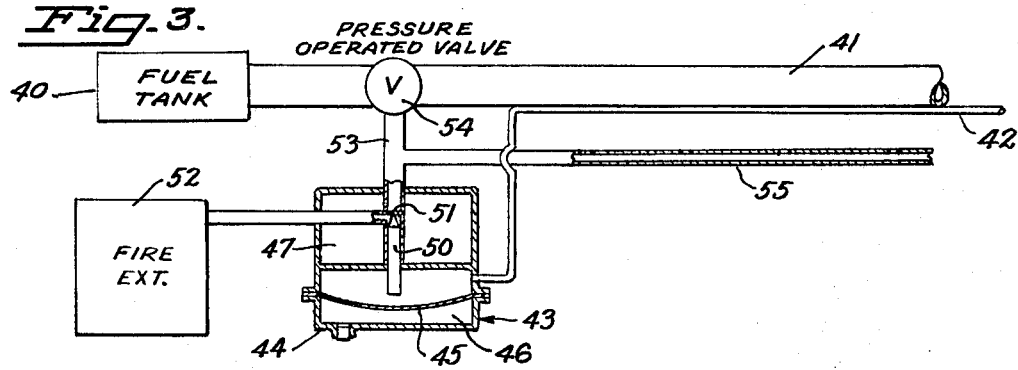
FIG. 3 is a diagrammatic view of another modified form of the invention applied to fuel lines.

FIG. 3 shows another modified form of system having some similarity to the systems considered but differing principally in being completely non-electric. Here is a fuel tank 40 with a fuel line 41 having one or more sensor tubes 42 attached to it. A control device 43 has a housing 44 divided by a diaphragm 45 into chambers 46 and 47, the tube 42 being sealed to the chamber 47 and having inert gas under high pressure, while the chamber 46 has gas under lower but still superatmospheric pressure.

Breakage of the tube 42 results in the diaphragm 45 being forced against a pin or punch 50 which then ruptures a soft metal diaphragm 51 to send fire extinguishing fluid under pressure from a supply 52 through a line 53 to close a pressure-actuated valve 54 that shuts off the fuel line and then to send the fluid to a fire extinguishing line 55 to put out the fire.

Figure 4:
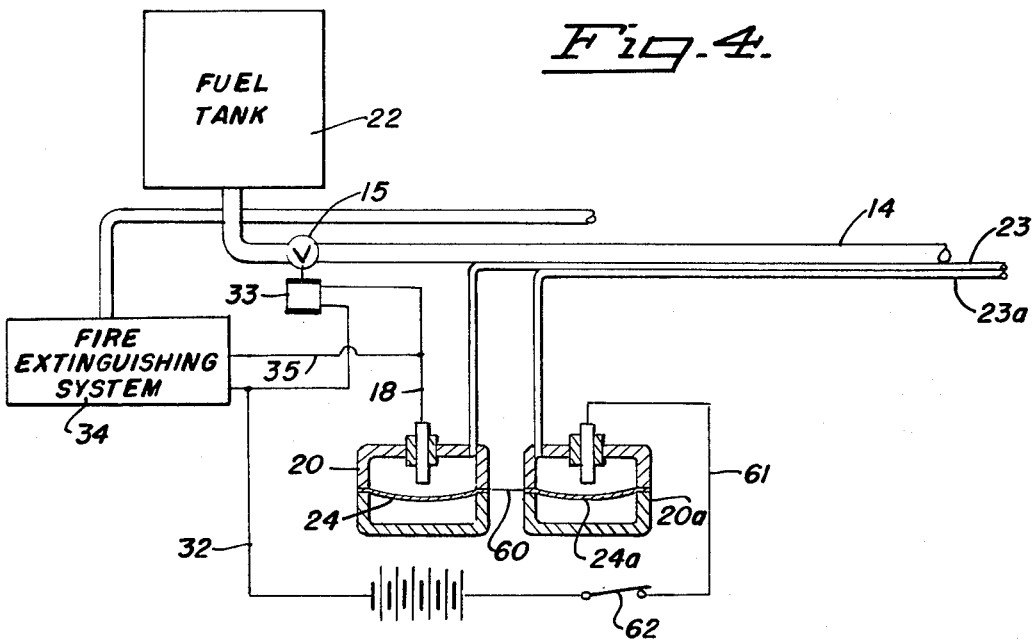
FIG. 4 is a modified form of the fuel-line-overstress-detection system of the invention, utilizing a dual-integrity system.

Sometimes the use of a dual-integrity system may be desirable. One example is shown in FIG. 4. In other words, there may be a plurality of tubes 23 and 23a for each line 14, each tube 23 and 23a having control devices 20, 20a the control devices 20 and 20a being connected with their diaphragms 24, 24a in electrical series by a lead 60 so that both must close in order to actuate the solenoid 33, the device 20a having to be energized in order to actuate the solenoid 33, via a lead 61. Use of dual-integrity systems guards against accidental and unintended actuation of the valve 15, whether due to physical damage less than what is dangerous to the fuel line 14 or loss of pressure in one tube 23 or 23a for any reason. An override switch 62 may be manually opened in order to de-actuate the actuated solenoid 33, if that is desired.

Any number of dual-integrity systems may be operated in series, all having to operate before there is actuation of the system. Conversely, either electrical or pneumatic or hydraulic systems may be assembled in parallel so that any *one* sensor will cause actuation. Series-parallel systems may similarly be used so that any one of the parallel systems will actuate the closure valve for the fuel line, with each parallel system having a plurality of devices in series.

An alternative form of dual-integrity system is shown in FIGS. 8 and 9. Here a fuel line 70 is shown surrounded by concentric tubes 71 and 72, both of them pneumatic warning devices. The wiring and control may be as in FIG. 4. Where the fuel line 70 may have separated segments connected by a fitting 73, the tubes 71 and 72 may be connected to their succeeding segments by by-pass tubes 74 and 75, with a fitting 76 for them.

The system of FIG. 3, may also be made dual-integrity by using two tubes 42 with two control devices 43 with their punches 50 in series, so that two diaphragms 51 must be punched open before the valve 54 can be closed or the fire-extinguishing operation commenced. Any number of dual-integrity systems may be operated in series, all having to operate before there is actuation of the system. Conversely, either electrical or pneumatic or hydraulic systems may be assembled in parallel so that any *one* sensor will cause actuation. Series-parallel systems may similarly be used so that any one of the parallel systems will actuate the closure valve for the fuel line, with each parallel system having a plurality of devices in series.

Figure 5:
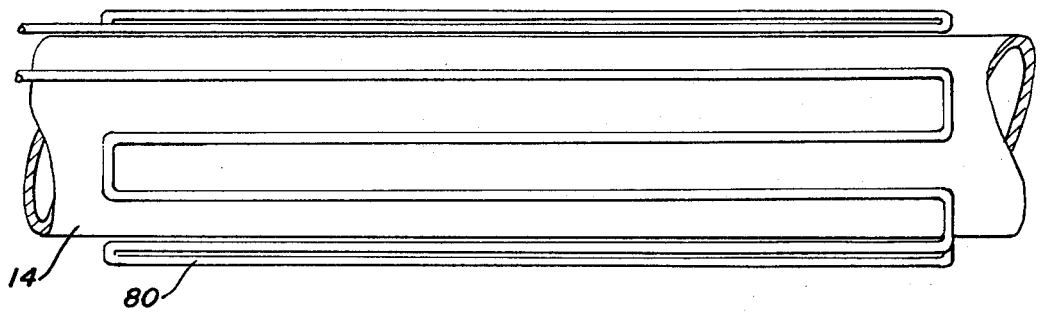
FIG. 5 is a fragmentary view in side elevation and partly in section of a sensor arrangement of the invention.
Figure 6:
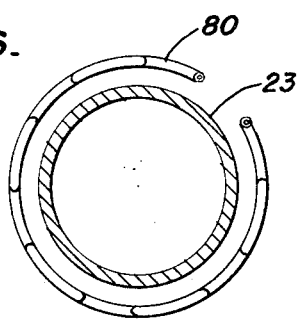
FIG. 6 is a view in section taken along the line 6—6 in FIG. 5.

FIGS. 5 and 6 show how a sensor 80 may be made to pass to-and-fro around a fuel line 14 to encircle the fuel line and thereby give protection from stresses and blows from all directions, not depending on the lower surface alone.

FIG. 7 shows an aircraft 81 with a fuselage 82 and a wing 83 having fuel tanks 84 and 85. A sensor 86 extends spanwise above and below the fuel tanks 84, 85, secured to a wing spar or other suitable structural member. The sensor 86 on at least one end enters the fuselage 82 where it is connected to a circuit like those of FIGS. 2 or 3. Again, fuel line cut-off may be had if desired, but, a warning device alone may be preferable here. Another sensor 87 is used to give protection to the fuselage.

The operation shown is exemplary. The normally open diaphragm may be replaced by a normally closed diaphragm, and so on. In fact, to those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A system for detecting structural overstressing including in combination
    a plurality of sensors, each comprising a pneumatic tube located along a path generally coaxial with the axis of structural overstressing to be detected, said sensors being arranged in parallel with each other to cover substantially the same path,
    pressure actuated means for each sensor connected to said tube thereof and actuated by a break of said tube relieving the pressure in said tube, said pressure actuated means being in series with each other, and
    response means with which said pressure actuated means are in series and actuated by actuation of all said pressure actuated means for responding to the overstressing to be detected.

2. The system of claim 1 wherein said sensors comprise a series of coaxial tubes surrounding each other.

3. The system of claim 1 wherein said sensor tubes surround and are coaxial with the structural member when overstressing is to be detected.

4. An aircraft safety system for aircraft having a fuel storage tank connected by a fuel line to an engine, comprising
a normally open shutoff valve in said fuel line located close to said storage tank,
control means for closing said shutoff valve, said control means including,
normally non-actuated actuating means,
a plurality of diaphragms arranged in series for actuating means only when all of said diaphragms are actuated,
superatmospheric pressure means on one side of each said diaphragm for causing each said diaphragm to be actuated,
a plurality of sensor tubes each connected to the other side of a said diaphragm and containing fluid exerting pressure greater than that of its associated said pressure means to prevent its said diaphragm from being actuated, each said tube being located along a path generally coaxial with and close to said fuel line and being slightly more easily frangible than said fuel line,
whereby a shock that will break the fuel line first breaks said tubes, releasing the pressure therefrom so that said series of diaphragms are moved by their said pressure means to cause closure of said shutoff valve.

5. The system of claim 4 wherein said shutoff valve is a solenoid valve and said control means actuating means comprises an electrical contact for each said diaphragm, all said contacts being in series with each other and in series with said solenoid of said solenoid valve and an electrical power circuit which is connected to said series of contacts when all of said diaphragms touch their contacts, said fluid in each said sensor tube normally preventing its diaphragm from touching its said contact.

6. The system of claim 5 wherein there is also a fire extinguishing system actuated by closure of all of said diaphragms against their said contacts.

7. The system of claim 4 wherein said shutoff valve is a fluid-pressure operated valve and said actuating means comprises an additional diaphragm, a source of fluid pressure on one side of said additional diaphragm, a conduit to said valve on the other side of said additional diaphragm and punch means for rupturing said additional diaphragm when the first mentioned said series of diaphragms are moved by their said pressure means upon release of the fluid pressure in every said tube.

8. The system of claim 7 wherein said source of fluid pressure comprises a storage means for fire-extinguishing fluid under pressure, and said conduit is connected to a series of fire extinguisher outlets as well as to said valve.

9. The aircraft safety system of claim 4 wherein each said sensor tube is attached to said fuel line and is made from material slightly less ductile than that of said fuel line.

10. The aircraft safety system of claim 4 for an aircraft having a fuselage wherein each said sensor tube is attached to the bottom of said fuselage along a path generally coaxial with the fuel line and is made of material slightly less ductile than that of said fuel line.

11. The aircraft safety system of claim 10 wherein said sensor tube is secured to the outside bottom surface of said fuselage.

12. The aircraft safety system of claim 4 wherein said sensor tubes comprise a series of coaxial tubes surrounding said fuel line along most of its path.

13. The aircraft safety system of claim 12 wherein successive said coaxial tubes have their interiors connected across joints in said fuel line by separate tubes.

References Cited

FOREIGN PATENTS 604,991  7/1948  Great Britain.

EVERETT W. KIRBY, *Primary Examiner.*